UNITED STATES PATENT OFFICE.

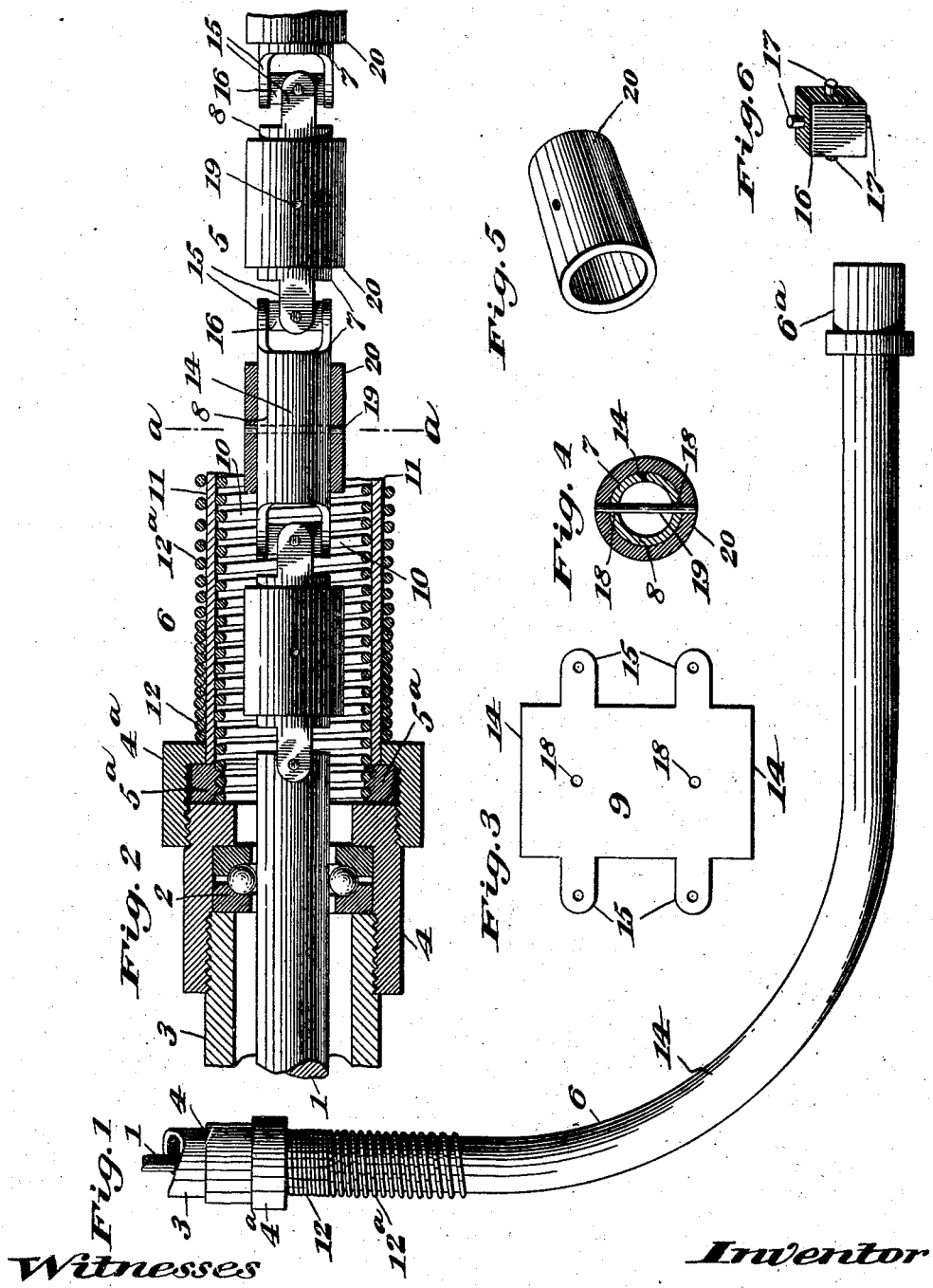

ALBERT LEE HALE, OF MARENGO, ILLINOIS.

FLEXIBLE SHAFT.

No. 889,521.   Specification of Letters Patent.   Patented June 2, 1908.

Application filed July 18, 1906. Serial No. 326,665.

*To all whom it may concern:*

Be it known that I, ALBERT LEE HALE, a citizen of the United States, and a resident of Marengo, in the county of McHenry and State of Illinois, have invented certain Improvements in Flexible Shafts, of which the following is a specification.

This invention relates to certain improvements in flexible shafts such as are adapted for use for driving machines of various kinds, as for example, grooming and clipping machines, drills and the like, the object of the invention being to provide a shaft of this character of a simple and inexpensive nature which shall present the minimum of wear and frictional loss with the maximum of durability, strength and flexibility.

The invention consists, in part, in a flexible shaft formed of pivotally connected links or sections, a sheath in which the shaft is incased, and wearing parts carried on the central portions of the respective links or sections and projecting therefrom for engagement with the inner wall of said sheath.

The invention also contemplates certain novel features and principles of the construction, and combinations and arrangements of the several parts of the improved flexible shaft, whereby certain important advantages are attained and the device is rendered simpler, cheaper and otherwise better adapted and more convenient for use, all as will be hereinafter fully set forth.

The novel features of the invention will be carefully defined in the claims.

In the accompanying drawings which serve to illustrate my improvements—Figure 1 is an elevation, drawn to a small scale and showing a flexible shaft embodying my improvements; Fig. 2 is an enlarged sectional view taken through the shaft at the driven end thereof, and showing certain features of construction to be hereinafter referred to; Fig. 3 is a view showing the contour of one of the blanks from which the links or sections of the improved shaft are constructed; Fig. 4 is a transverse section taken through one of the links or sections in the plane indicated by the dotted line $a$—$a$ in Fig. 2; Fig. 5 is a perspective view showing, detached, one of the anti-friction sleeves with which the links or sections of the improved shaft are provided, and Fig. 6 is a perspective view showing, detached, one of the coupling parts or members which are interposed between and pivotally connected with adjacent links or sections of the improved shaft.

In these views I have shown the improved flexible shaft connected with a source of power in the form of a rigid shaft 1, mounted to turn in a bearing 2 within a sleeve 3, but I do not wish to be understood as limiting myself to the employment of these parts as shown, since they form no part of the present invention and it will be obvious that the improved flexible shaft may as well be employed in connection with other driving devices.

5 indicates the flexible shaft as a whole, one end of which has connection with the rigid shaft at the end of the sleeve or casing 3 thereof, and 6 represents a flexible housing or sheath in which the flexible shaft 5 is incased and which serves not alone to protect the incased shaft, but also to protect the persons and clothing of attendants from damage due to being caught by the shaft links or sections or by the escape of lubricant such as is commonly used freely upon shafts of this general character.

The sheath or housing 6 of the flexible shaft is formed in two parts or members,— an inner part or member 10, made in the form of a coiled metal strip or wire, inside of which the flexible shaft 5 is adapted to freely turn and an outer part or member 11, made in tubular form from some material which is as nearly oil-proof as possible, the said outer tubular part or member 11 being arranged to fit snugly over the inner metallic sheath member 10.

The coils or spiral turns of the inner sheath member 10 are spaced slightly apart from each other as seen in Fig. 2, to permit the required lengthening and shortening of the sides of the sheath 6 to compensate for flexure of the incased flexible shaft, and one end of the sheath or housing is connected with a coupling sleeve 4, screwed upon the end portion of the sleeve 3, within which the rigid shaft 1 turns. The end of the flexible sheath or housing 6 is adapted for turning movement with relation to the sleeve 4, being provided at its end with a head or enlargement $5^a$ mounted to turn in a screw-cap $4^a$ screwed on sleeve 4 and engaged outside the annular shoulder formed by said head or enlargement $5^a$ upon the end of the sheath or housing 6.

The arrangement of the flexible sheath or housing with its head or enlargement 5ª held to turn axially within the cap 4ª, permits a tool or other device carried on the driving end of the flexible shaft to be swung completely around in a circular path without danger of twisting the sheath or housing, so that the device is adapted for much more convenient use than is the case where such sheath or housing is held against such turning movement at its connection with the coupling sleeve. For connection with such a tool or other device, there is provided upon the free end of the device a socket-piece 6ª, with which the flexible sheath or housing has rotative connection in a similar way and whereon is adapted to be carried a brush or other tool for operative connection with that end of the flexible shaft 5 within the sheath or housing.

The metal strip or wire from which the inner coiled metallic sheath member 10 is produced is also given, by preference, a circular or rounded form in cross section, so that there shall be no sharp edges between which the outer sheath member 11 may be caught when the sheath or housing is flexed, whereby it will be seen that the members of the sheath or housing are adapted for free movement over each other at all times and the outer tubular member 11 is protected against being cut or worn by contact with such sharp edges of the coiled wire or strip.

The flexible shaft 5 is formed from a plurality of links or sections 7, 7, each of which has a cylindrical tubular central portion 8 and is formed from a blank 9 of the contour shown in Fig. 3, the blanks 9 for the links or sections being cut or otherwise produced from flat sheet metal or other suitable material of suitable strength and having, along opposite sides, corresponding straight edge surfaces 14, 14, which are adapted, when the blanks are bent or worked into cylindrical tubular form, in the manufacture of the links or sections 7, 7, to meet flush against each other and produce a joint extended lengthwise along one side of each link as clearly shown in Fig. 4.

The blanks 9, are also formed at opposite ends, with two sets of alined integral lugs or arms 15, 15, the arms or lugs of each set being so spaced apart as to stand diametrically opposite each other in the finished link or section produced by bending or working the blank into rounded form, and said arms or lugs 15 are perforated for the passage of pivot pins or studs 17, integrally produced upon the sides of coupling parts or members 16, one of which is interposed between each two links or sections 7, 7, of the shaft, whereby said links or sections are pivotally connected with one another.

Each coupling part or member 16 is made in the form seen in Fig. 6, with two sets or pairs of oppositely arranged pins or studs 17, 17, integrally formed upon it, the studs or pins of one set or pair being arranged at opposite points midway between the studs or pins of the other pair or set. In connecting a link or section 7 to a coupling part or member 16, the arms or lugs 15, 15, at one end of the link or section 7 are first sufficiently spread apart to receive opposite pins or studs 17, 17 of the coupling member in their perforations, and when said pins or studs are engaged in said perforations, the arms or lugs 15, 15 are bent or pressed towards each other so as to effectively hold the link or section to the coupling member. The next link or section of the shaft has its arms 15 pivotally connected in a similar way with the other pair or set of pins or studs 17, 17, of said coupling member 16, the arms 15 of the last-mentioned link or section 7 being thus arranged midway between those of the first-mentioned link, so that the links or sections will pivot upon said coupling member 16 upon axes at right angles to each other to produce a universal joint or connection between each two adjacent links or sections 7, 7, permitting flexure of the improved shaft in various directions for accommodating convenient use of the tool or other device carried upon the shaft.

Upon each link or section 7 of the improved shaft is held an anti-friction bushing or wearing sleeve 20, preferably formed of a tubular piece of compressed fiber or other suitable material held upon the central cylindrical body portion of the link or section by means of a pin 19 passed through openings 18, 18, at diametrically opposite points in the central tubular portion 8 of the link or section, and these wearing parts or bushings are adapted, by contact of their peripheral surfaces with the inner coiled metal member 10 of the sheath or housing 6, to prevent contact of the arms 15 of the links or sections with said sheath when the shaft is flexed, so as to lessen the strain and wear of the arms and sheath as much as possible. The bushings or sleeves 20, together with the pins 19, also serve to strengthen the finished links or sections of the shaft and to prevent opening of the joints between the meeting edges 14, 14, of the blanks from which said links or sections are formed and thereby also to prevent disengagement of the arms or lugs 15 from the studs or pins 17, 17 of the coupling members.

To reinforce the sheath or housing at the point where it is connected with the sleeve 4 on the rigid sheath or casing 3, I provide on the outer side of said flexible sheath a wire coil 12, the spiral turns of which are gradually opened or spread apart as seen at 12ª so that a graduated resistance to flexure is afforded at this point and increased strength and durability are afforded. I have ascertained that where the flexible sheath or housing 6 is unprovided with such a reinforce, at its point of connection with a rigid part, the strains imposed upon said sheath or housing in flexure of the incased shaft are so great as to quickly damage and break the sheath.

The flexible shaft is completely housed and incased by its flexible sheath 6 so that there is no liability of the shaft catching in the clothing or on the person of the operator and the structure of said shaft is such that sufficient strength and durability is imparted thereto without in any way interfering with the flexure or sweep of the shaft required in machines in connection with which the shafts are designed for use. Also, since shafts of this character commonly require the free use of lubricant, it is evident that the employment of the outer sheath member 11 is of considerable advantage in preventing the waste of the lubricant and soiling of clothing therewith.

The antifriction bushings or wearing sleeves 20 serve to materially reduce the friction and wear common in shafts of this character, since by their engagement upon the walls of the flexible sheath, said bushings or sleeves serve to limit the flexure of the shaft within desirable bounds and prevent kinking thereof and also to prevent the arms 15 at the ends of the links from engaging too forcibly upon the inner coiled wire member 10 of the sheath or housing. These bushings or sleeves do not, however, interfere in any way with the necessary or desirable flexure of the shaft, which is sufficient for all practical purposes.

The links or sections of the improved shaft being formed or bent up from blanks cut from sheet metal, permit of being manufactured at very small expense compared with the expense attendant on the manufacture of links or sections of other constructions, so that the improved flexible shaft is of an extremely simple and strong nature and at the same time is comparatively inexpensive. This special structure of the links or sections is also of advantage since it permits of more readily connecting the links with the coupling members, it being possible to make connection between these parts in the bending of the blanks into cylindrical form, so that accidental breakage or weakening of the arms 15 is prevented.

From the above description it will be seen that the improved flexible shaft is of a comparatively simple and inexpensive nature, and is especially well adapted for use since it affords a maximum of strength and general efficiency with a minimum of wear and frictional loss, and it will also be obvious from the above description that the device is capable of considerable modification without material departure from the principles and spirit of the invention, and for this reason I do not wish to be understood as limiting myself to the precise form and arrangement of the several parts of the improved flexible shaft herein set forth in carrying out my invention in practice.

Having thus described my invention, what I claim and desire to secure by Letters Patent is—

1. A flexible shaft formed of pivotally connected links or sections, a sheath in which the shaft is incased and wearing parts at the central parts of the respective links or sections and arranged to turn in unison therewith and projecting from said links or sections for engagement with the inner wall of said sheath.

2. A flexible shaft formed of pivotally connected links or sections each made in cylindrical form at its central part, a sheath in which the shaft is incased, and wearing parts arranged to turn in unison with the links or sections and projecting in annular form from the central parts of the links or sections for engagement with the inner wall of said sheath.

3. A flexible shaft formed of pivotally connected links or sections each made in cylindrical form at its central part, a sheath in which the shaft is incased, and wearing parts formed from sections of fiber tubing on the central parts of the links or sections, and secured to turn in unison therewith and projecting in annular form from the central portions of the links or sections for engagement upon the walls of said sheath.

4. The combination of a flexible shaft having driving means, a sheath inclosing said shaft, means located at the driven end of the shaft for supporting the sheath, and a reinforce at the supported end of the shaft and formed of a coiled metal strip arranged outside the sheath and having the spaces between its coils gradually increased at one end, whereby said coils at that end of the reinforce are caused to stand at gradually increasing distances apart, measured lengthwise of the shaft.

In testimony whereof I have hereunto signed my name at Chicago, Illinois, this 16th day of July 1906, in the presence of two subscribing witnesses.

ALBERT LEE HALE.

Witnesses:
J. D. CAPLINGER,
W. F. MOORE.